United States Patent [19]

Arzoumanidis et al.

[11] Patent Number: 4,612,299

[45] Date of Patent: Sep. 16, 1986

[54] MAGNESIUM CARBOXYLATE SUPPORTS

[75] Inventors: Gregory G. Arzoumanidis; Habet M. Khelghatian, both of Naperville; Sam S. Lee, Hoffman Estates, all of Ill.

[73] Assignee: Amoco Corporation, Chicago, Ill.

[21] Appl. No.: 741,858

[22] Filed: Jun. 6, 1985

Related U.S. Application Data

[63] Continuation-in-part of Ser. No. 629,106, Jul. 9, 1984, abandoned, and a continuation-in-part of Ser. No. 592,910, Mar. 23, 1984, Pat. No. 4,590,679.

[51] Int. Cl.$^4$ .............................. C08F 4/02; C08F 4/64
[52] U.S. Cl. .................................. 502/104; 502/115; 502/120; 502/126; 502/128; 502/133; 526/124
[58] Field of Search ............... 502/104, 115, 120, 133, 502/126, 128

[56] References Cited

U.S. PATENT DOCUMENTS

| | | | |
|---|---|---|---|
| 4,199,473 | 4/1980 | Timms | 502/115 X |
| 4,244,838 | 1/1981 | Gessell | 502/111 |
| 4,347,157 | 8/1982 | Yamada et al. | 502/126 X |
| 4,439,537 | 3/1984 | Murai et al. | 502/133 X |
| 4,439,539 | 3/1984 | Takitani et al. | 502/126 X |

OTHER PUBLICATIONS

The Condensed Chemical Dictionary, Fifth Edition, Pub. by Reinhold Pub. Corp., New York (1956), pp. 263, 398, 399 & 1078.

*Primary Examiner*—Patrick P. Garvin
*Attorney, Agent, or Firm*—William H. Magidson; William T. McClain; Ralph C. Medhurst

[57] ABSTRACT

Composition comprising a transition metal component and magnesium carboxylate prepared by reacting a solution of hydrocarbyl magnesium compound with carbon dioxide to precipitate a magnesium carboxylate and reacting magnesium carboxylate with transition metal component.

18 Claims, No Drawings

MAGNESIUM CARBOXYLATE SUPPORTS

CROSS REFERENCE TO RELATED APPLICATIONS

This application is a continuation in part to U.S. Ser. Nos. 629,106 filed July 9, 1984 now abandoned, and 592,910 filed Mar. 23, 1984 and now U.S. Pat. No. 4,590,679 the specifications and claims of which are incorporated by reference herein.

BACKGROUND OF THE INVENTION

This invention relates to a composition comprising a transition metal component and a magnesium carboxylate support. More particularly this invention relates to a composition comprising a titanium component and a support comprising the reaction product of carbon dioxide and a hydrocarbyl magnesium compound.

It is well known that normally solid, high molecular weight, predominantly crystalline polymers of alpha-olefins such as ethylene, propylene, butene-1, etc. can be prepared using a catalyst comprising an organoaluminum compound and a transition metal compound. Among such catalysts, those wherein the transition metal compounds are supported on a catalytically inert material, such as a metal oxide support, have been found particularly advantageous in the polymerization of ethylene and copolymerization of ethylene-dominated mixtures of alpha-olefins. Typically, such catalysts exhibit higher activities, give higher polymer yields and make more efficient use of transition metal compounds than do catalysts containing unsupported transition metal compounds. Until recently, however, supported transition metal catalyst components have found little or no commercial use in the stereospecific polymerization of alpha-olefins of three or more carbon atoms. While commonly assigned Karayannis, U.S. Pat. No. 4,277,370, which is hereby incorporated by reference, discloses a new catalyst for the stereospecific polymerization of alpha-olefins of three or more carbon atoms comprising an organoaluminum compound and a component prepared from a halogen containing compound of titanium (IV), organic electron donor and a pretreatment product of components comprising magnesium alcoholate, etc., the catalyst resulting from this process, like most of the catalysts of this art, has the drawback that the particles are of different sizes and shapes, including particles of undesirably small dimension, e.g. fines. Catalyst fines are a particular problem since most supported catalyst components for vapor phase polymerization of $C_3$ or higher olefins are routinely abraded to provide the catalysts higher activity. When irregularly shaped catalysts are polymerized under vapor phase conditions, the resulting polymerizates assume the shape of the catalyst particles. Further, the polymerizates have an extremely broad particle distribution including a relatively high concentration of very small particles. Such polymerizates are less than ideal for further processing. Accordingly, there is a need for relatively uniform supported catalyst components. In addition to the foregoing, there is always a need for new catalyst components, particularly those of higher activity or capable of simpler production.

In commonly assigned application Ser. No. 592,910 now U.S. Pat. No. 4,540,679 filed Mar. 23, 1984 there is described a method of forming magnesium hydrocarbyl carbonate supported transition metal components of improved morphology by reacting $CO_2$ with a magnesium alcoholate suspension to form a magnesium hydrocarbyl carbonate and reacting said magnesium hydrocarbyl carbonate with a transition metal component. For example, the magnesium hydrocarbyl carbonate support can be formed by suspending magnesium ethoxide in an alcohol medium, adding carbon dioxide until the magnesium ethoxide dissolves forming magnesium ethyl carbonate and precipitating the magnesium ethyl carbonate reaction product from the solution as discrete spheres and/or oblong particles by treating with antisolvent, such as an alkyl aluminum compound or transition metal compound. If the magnesium ethoxide is suspended in a liquid hydrocarbon or halohydrocarbon, (free of alcohol) the addition of carbon dioxide results in the breaking apart of the magnesium ethoxide particles and the magnesium reaction product does not dissolve. In either case the magnesium support is relatively uniform, contains a relatively low level of fines and can be processed into an effective catalyst for the polymerization of olefins, particularly $C_3$ olefins without any need for ball milling.

The general object of this invention is to provide a new class of catalyst components or catalysts comprising a transition metal component and a magnesium support. Another object of this invention is to provide a new class of catalysts or catalyst components having a reduced level of fines. Other objects appear hereinafter.

DESCRIPTION OF THE INVENTION

The objects of this invention can be attained by (1) reacting a solution of a hydrocarbyl magnesium compound with carbon dioxide precipitating magnesium carboxylate from the solvent as spheres and/or oblong particles and (2) treating the magnesium carboxylate with transition metal component, preferably a titanium (IV) halide to form the supported catalyst. At least one Group II or IIIA metal alkyl is reacted with the transition metal reaction product of (1) and (2) or with the magnesium carboxylate before the reaction of (1) and (2). Optionally the reaction product of (1) and (2) or the magnesium carboxylate before or at the same time as the reaction of (1) and (2) can be treated with (a) at least one organic electron donor, (b) at least one modifier selected from the group consisting of mineral acids and anhydrides of sulfur, organochalcogenide derivatives of hydrogen sulfide, organic acids, organic acid anhydrides and organic acid esters and/or (c) at least one chlorohydrocarbon and/or at least one silane.

The reaction of the hydrocarbyl magnesium compound with $CO_2$ can be represented as follows:

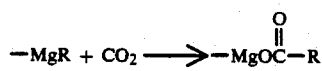

where R is a hydrocarbyl group of 1 to 20 carbon atoms. If there are two hydrocarbyl groups, the reaction can be represented as follows:

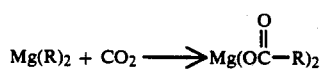

The hydrocarbyl magnesium compounds useful in this invention have the structure R-Mg-Q wherein Q is hydrogen, halogen or R' (each R' is independently a hydrocarbyl group of 1 to 20 carbon atoms.) Specific examples of hydrocarbyl magnesium compounds useful in this invention include: $Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{33})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(C_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, etc. Mixtures of hydrocarbyl magnesium compounds also can be employed if desired.

From the standpoint of cost and availability, dihydrocarbyl magnesium compounds preferred for use in this invention are those of the formula $Mg(R')_2$ wherein $R'$ is as defined above. In terms of catalytic activity and stereospecificity, best results are achieved through the use of hydrocarbyl magnesium halide compounds of the formula $Mg(R')Q'$ wherein $R'$ is an alkyl radical of 1 to about 18 carbon atoms, an aryl radical of 6 to about 12 carbon atoms or an alkaryl or aralkyl radical of 7 to about 12 carbon atoms and $Q'$ is chloride or bromide.

Useful Group II and IIIA metal alkyls are compounds of the formula $MR^3_m$ wherein M is a Group II or IIIA metal, each $R^3$ is independently an alkyl radical of 1 to about 20 carbon carbon atoms, and m corresponds to the valence of M. Examples of useful metals, M, include magnesium, calcium, zinc, cadmium, aluminum, and gallium. Examples of suitable alkyl radicals, $R^3$, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum.

If desired, metal alkyls having one or more halogen or hydride groups can be employed, such as ethylaluminum dichloride, diethylaluminum chloride, ethylaluminum sesquichloride, diisobutylaluminum hydride, etc.

To maximize catalyst activity it is preferred to incorporate one or more modifiers, such as silanes, mineral acids, organometallic chalcogenide derivatives of hydrogen sulfide, organic acids, organic acid esters, and mixtures thereof.

Specific examples of useful mineral acids and anhydrides of sulfur include sulfur dioxide. Hydrogen sulfide, which behaves as a weak acid in aqueous solution, also is considered a mineral acid of sulfur for purposes hereof. Also contemplated are the organometallic chalcogenide derivatives of hydrogen sulfide in which each hydrogen is replaced by an organosilicon, organogermanium, or organotin group wherein the organic radicals are selected from the group consisting of phenyl, alkyl-substituted phenyl, phenyl-substituted alkyl, and alkyl radicals, such alkyl radicals containing 1 to about 6 carbon atoms. Specific examples of useful organometallic chalcogenide modifiers include bis(triphenyltin)sulfide, bis(tritolytin)sulfide, bis-(triethylphenyltin)sulfide, bis-(trihexylphenyltin)sulfide, bis-(triphenylmethyltin)sulfide, bis-(triphenylethyltin)sulfide, bis-(triphenylhexyltin)sulfide, bis-(trimethyltin)sulfide, bis-(triethyltin)sulfide, bis-(tributyltin)sulfide, bis-(trihexyltin)sulfide, and similar silicon- and germanium-containing compounds.

Among the mineral acids and anhydrides of sulfur and organometallic chalcogenide derivatives, sulfuric acid, fuming sulfuric acid, chorosulfonic acid, and hydrogen sulfide are preferred because they lead to the best overall improvements in activities and stereospecificities.

Suitable organic acids contain from 1 to about 20 carbon atoms and 1 to about 4 carboxyl groups. Such acids include aliphatic acids of 1 to about 20 carbon atoms; halogen-, hydroxyl-, oxo-, alkyl-, alkoxy-, aryl-, and/or arloxy-substituted aliphatic acids of 1 to about 20 carbon atoms, aromatic acids of 7 to about 14 carbon atoms; and halogen-, hydroxyl-, alkyl-, alkoxy-, aryl-, and/or aryloxy-substituted aromatic acids of 7 to about 20 carbon atoms. The polycarboxylic acids are preferred, particularly aromatic polycarboxylic acids having acid groups ortho to each other.

Specific examples of useful aliphatic acids include saturated acids such as formic acid, acetic acid, oxalic acid, malonic acid, butyric acid, pivalic acid, valeric acid, glutaric acid, caproic acid, cyclohexanecarboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Specific examples of useful substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Specific examples of useful aromatic acids, substituted aromatic acids and anhydrides include benzoic acid, phthalic acid, phthalic anhydride trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acids, veratric acid, asaronic acid, ethoxybenzoic acids, piperonylic acids, vanillic acid, cresotic acid, and everninic acid.

Suitable organic acid esters include alkyl and haloalkyl esters of acids such as are described above wherein the alkyl group or groups contain 1 to about 12 carbon atoms, and aryl and haloaryl esters of such acids wherein the aryl group or groups contain 6 to about 10 carbon atoms. Specific examples of useful organic acid esters include the methyl, chloromethyl, ethyl, chloroethyl, bromomethyl, butyl, isobutyl, hexyl, cyclohexyl, octyl, chlorododecyl, phenyl, chlorophenyl, and naphthyl esters of acids such as are named above.

Preferred organic acids and esters are benzoic acid, halobenzoic acids, phthalic acid, isophthalic acid, terephthalic acid and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, and diisobutyl phthalate as these give good results in terms of activity and stereospecificity and are convenient to use.

Suitable transition metal compounds which can be used in this invention include compounds represented by the formula $T_a Y_b X_{c-b}$ wherein $T_a$ is a transition metal selected from Groups IV-B, V-B and VI-B of the Periodic Table of Elements, Y is oxygen, OR' or NR'$_2$; wherein each R' is independently hydrogen or hydrocarbyl group of 1 to 20 carbon atoms; X is a halogen, preferably chlorine or bromine; c has a value corresponding to the valence of the transition metal, $T_a$; b has a value of from 0 to 5 with a value of c-b being from at least 1 up to value of the valence state of the transition metal $T_a$.

Suitable transition metal compounds include, halide compounds of titanium, zirconium, vanadium and chromium, such as chromyl chloride, vanadium oxytrichloride, zirconium tetrachloride, vanadium tetrachloride etc.

Titanium (IV) compounds useful in preparation of the stereospecific supported catalyst components of this invention are titanium halides and haloalcoholates having 1 to about 20 carbon atoms per alcoholate group such as methoxy, ethoxy, butoxy, hexoxy, phenoxy, decoxy, napthoxy, dodecoxy and eicosoxy. Mixtures of titanium compounds can be employed if desired.

Preferred titanium compounds are the halides and haloalcoholates having 1 to about 8 carbon atoms per alcoholate group. Examples of such compounds include TiCl$_4$, TiBr$_4$, Ti(OCH$_3$)Cl$_3$, Ti(OC$_2$H$_5$)Cl$_3$, Ti(OC$_4$H$_9$)Cl$_3$, Ti(OC$_6$H$_5$)Cl$_3$, Ti(OC$_6$H$_{13}$)Br$_3$, Ti(OC$_8$H$_{17}$)Cl$_3$, Ti(OCH$_3$)$_2$Br$_2$, Ti(OC$_2$H$_5$)$_2$Cl$_2$, Ti(OC$_6$H$_{13}$)$_2$Cl$_2$, Ti(OC$_8$H$_{17}$)Br$_2$, Ti(OCH$_3$)$_3$Br, Ti(OC$_2$H$_5$)$_3$Cl, Ti(OC$_4$H$_9$)$_3$Cl, Ti(OC$_6$H$_{13}$)$_3$Br, and Ti(OC$_8$H$_{17}$)$_3$Cl. Titanium tetrahalides and particularly TiCl$_4$ are most preferred from the standpoint of attaining maximum activity and stereospecificity. If desired, stable tetrahydrocarbyl titanium compounds, such as Ti(benzyl)$_4$, can be used.

Organic electron donors useful in preparation of the stereospecific supported catalyst components of this invention are organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as modifiers as described above, aliphatic alcohols such as methanol, ethanol, propanols, butanols, pentanols, hexanols, and so forth, aliphatic diols and triols such as ethylene glycol, propanediols, glycerol, butanediols, butanetriols, pentanediols, pentanetriols, hexanediols, hexanetriols, and so forth; aromatic alcohols such as phenol, di-, tri-, and tetrahydroxybenzenes, naphthols, and dihydroxynaphthalenes; aralkyl alcohols such as benzyl alcohol, phenylethanols, phenylpropanols, phenylbutanols, phenylpentanols, phenylhexanols, and so forth; alkaryl alcohols such as cresols, xylenols, ethylphenols, propylphenols, butylphenols, pentylphenols, hexylphenols, and so forth; dialkyl ethers such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetol, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propionaldehyde, butyraldehyde, valeraldehyde, caproaldehyde, and so forth, benzylaldehyde, tolualdehyde, and alpha-tolualdehyde; and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and diphenyl ketone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, tetraethylputrescine, diphenylmethylamine, triphenylamine, tritolylamine, diphenylbenzylamine, diphenylethylamine, diethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thiols such a methanethiol, ethanethiol, ethanedithiol, propanethiols, butanethiols, butanedithiols, hexanethiols, and the like, thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like, aminoalcohols such as ethanolamine, hydroxyanilines, aminocresols, and the like; amine oxides such as lutidine-N-oxides and collidine-N-oxides; aminoethers such as bis(2-ethoxyethyl)amine thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, tri(ethylthio)phosphite, hexamethylphosphoric triamide, and the like; and phosphine oxides such as trimethylphosphine oxide, triphenylphosphine oxide, and the like.

From the standpoint of catalyst performance and preparative ease, the organic electron donors which are preferred according to this invention are C$_1$–C$_6$ alkyl esters of aromatic carboxylic acids and halogen-, hydroxyl-, oxo-, alkyl, alkoxy-, aryl-, and/or aryloxy-substituted aromatic monocarboxylic acids. Among these, the alkyl esters of benzoic, halobenzoic, phthalic, terephthalic and isophthalic acids wherein the alkyl group contains 1 to about 6 carbon atoms, such as methyl benzoate, methyl bromobenzoate, ethyl benzoate, ethyl chlorobenzoate, ethyl bromobenzoate, ethyl benzoate, ethyl chlorobenzoate, ethyl bromobenzoate, butyl benzoate, isobutyl benzoate, diisobutyl phthalate, hexyl benzoate, and cyclohexyl benzoate are particularly preferred. Best results are attained through the use of diesters.

Diluents or solvents suitable for use in the carbonation of hydrocarbyl magnesium compounds or for facilitating the reaction of aluminum alkyls or transition metal halides with the magnesium carboxylates include non-polar hydrocarbons and halogenated derivatives thereof, ethers and mixtures thereof that are substantially inert to the reactants employed and, preferably, are liquid at the temperatures of use. It also is contemplated to conduct the reaction at elevated pressure so that lower-boiling diluents can be used even at higher temperatures. Examples of useful diluents include alkanes such as hexane, cyclohexane, ethylcyclohexane, heptane, octane, nonane, decane, undecane, and so forth; haloalkanes such as 1,1,2-trichloroethane carbon tetrachloride etc. aromatics such as xylenes and ethylbenzene; and halogenated and hydrogenated aromatics such as chlorobenzene, o-dichlorobenzene, tetrahydronaphthalene and decahydronaphthalene; ethers, such as dialkyl ethers, such as dibutyl ether, diamyl ether, cyclic ethers, such as tetrahydrofuran, dioxane, etc.

In somewhat greater detail, the magnesium carboxylate support is prepared by dissolving hydrocarbyl magnesium compound in a liquid preferably an inert hydrocarbon or halogenated hydrocarbon and/or ether. Approximately 10 to 80 parts by weight hydrocarbyl magnesium compound is suspended per 100 parts by weight liquid. A sufficient amount of carbon dioxide is bubbled into the liquid suspension to provide from about 0.1 to 4 mols of carbon dioxide per mol of hydrocarbyl magnesium compound with mild stirring.

Approximately 0.3 to 4 mols of $CO_2$ are added to the solution of hydrocarbyl magnesium with stirring at a temperature of about 0 to 100° C. over a period of approximately 10 minutes to 4 hours until the hydrocarbyl magnesium compound precipitates from the medium. The magnesium carboxylate suspension can be added to the metal alkyl (e.g. aluminum alkyl) or transition metal halide or the metal alkyl or transition metal halide added to the magnesium carboxylate solution. In those cases where the metal alkyl or transition metal halide is added to the magnesium carboxylate, it is usually desirable to dilute the magnesium carboxylate with an inert hydrocarbon or halohydrocarbon or ether.

It is preferred that the transition metal compound, preferably titanium (IV) and magnesium carboxylate are reacted with electron donor components. The electron donor compound and transition metal compound can be contacted together in the presence of an inert hydrocarbon or halogenated diluent or ether with the magnesium carboxylate although other suitable techniques can be employed. Suitable diluents are materials which are substantially inert to the component employed and are liquid at the temperature employed or can be maintained in the liquid state through the use of elevated pressure. As in the case of the diluents employed in the formation of the magnesium carboxylate, it is desirable to purify any diluent to be employed to remove, water, oxygen, carbon monoxide and other extraneous catalyst poisons. In some cases it is desirable to react the electron donor with the reaction product of magnesium carboxylate and transition metal compound. Reaction between the magnesium carboxylate, transition metal component, preferably titanium (IV) and organic electron donor is carried out at temperatures ranging from about −10° C. to 170° C. Generally the reaction is carried out over a period of several minutes to several hours.

In preparation of the stereospecific supported catalyst components of this invention, the magnesium-containing product, transition metal component, and organic electron donor component are contacted in amounts such that the atomic ratio of transition metal to magnesium in the magnesium-containing component is at least about 0.5:1. Preferably, this ratio ranges from about 0.5:1 to about 20:1. Greater amounts of transition metal can be employed without adversely affecting catalyst component performance, but there typically is no need to exceed a transition metal to magnesium ratio of about 20:1 as only a portion of the transition metal is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging up to about 3.0 mole per gram atom of transition metal, and preferably from about 0.1 to about 2.5 mole per gram atom of titanium. The atomic ratio of metal in the Group II or IIIA metal alkyl component to metal in the magnesium hydrocarbyl carbonate component ranges from about 0.001:1 to about 1:1. Preferably, this ratio ranges from about 0.005:1 to about 0.5:1 to provide the best catalyst performance.

The above-described process is conducted in the substantial absence of water, oxygen, carbon monoxide, and other extraneous materials capable of adversely affecting the performance of the invented catalyst components. Such materials are conveniently excluded by carrying out the pretreatment in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or heating of reactant.

Although not required, the solid reaction product prepared as described herein can be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferably Lewis acids are $TiCl_4$ and $SiCl_4$. Mixtures of Lewis acids can be employed if desired.

Although not required, the above-described solid reaction product can be washed with an inert liquid hydrocarbon or halogenated hydrocarbon before contact with a Lewis acid. Suitable inert liquids include those identified hereinabove as pretreatment and preparative diluents.

In addition, the reaction mixture of magnesium carboxylate and transition metal component can contain chlorocarbons and/or organo silanes. Chlorocarbon and/or organo chloro silane are advantageously present during the reaction of the transition metal component and magnesium carboxylate to provide a better medium for the activation of the catalyst.

Suitable useful chlorocarbons contain one to about 12 carbon atoms and from one to about 10 chlorine atoms. Examples of chlorocarbons include chloroform, methylene chloride, 1,2-dichloroethane, 1,1-dichloroethane, 1,1,2-trichloroethane, 1,1,1-trichloroethane, carbon tetrachloride, ethyl chloride, 1,1,2,2-tetrachloroethane, pentachloroethane, hexachloroethane, 1,1-dichloropropane, 1,2-dichloropropane, 1,3-dichloropropane, 2,2-dichloropropane, 1,1,1-trichloropropane, 1,1,2-trichloropropane, 1,1,3-trichloropropane, 1,2,3-trichloropropane, 1,1,1,2-tetrachloropropane, 1,1,2,2-tetrachloropropane, 1,1,1,2,3-pentachloropropane, 1,1,2,3,3-pentachloropropane, 2-methyl-1,2,3-trichloropropane, 1,1-dichlorobutane, 1,4-dichlorobutane, 1,1-dichloro-3-methylbutane, 1,2,3-trichlorobutane, 1,1,3-trichlorobutane, 1,1,1,2-tetrachlorobutane, 1,2,2,3-tetrachlorobutane, 1,1,2,3,4,4-hexachlorobutane, 1,1,2,2,3,4,4-heptachlorobutane, 1,1,2,3,4-pentachlorobutane, 2-methyl-2,3,3-trichlorobutane, 1,2-dichloropentane, 1,5-dichloropentane, 1,1,2,2-tetrachlorohexane, 1,2-dichlorohexane, 1,6-dichlorohexane, 3,4-dichloro-3,4-dimethylhexane and the like. Preferable chlorocarbons used in this invention include carbon tetrachloride, 1,1,2-trichloroethane and pentachloroethane.

Haloalkylchlorosilanes useful in this invention include compounds with the formula

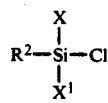

wherein R is a haloalkyl radical containing one to about ten carbon atoms or a halosilyl radical or haloalkylsilyl radical containing one to about eight carbon atoms, and X and $X^1$ are halogen, hydrogen, or alkyl or haloalkyl radicals containing one to about ten carbon atoms. Typically, $R^2$ is a chloroalkyl radical containing one to about eight carbon atoms and one to about twelve chlorine atoms, and X is chlorine or a chloroalkyl radical containing one to four carbon atoms, and $X^1$ is a hydrogen or chlorine. Preferable haloalkylchlorosilanes useful in this invention are dichlorosilanes and trichlorosilanes. Also preferable are haloalkylchlorosilanes containing a chloroalkyl group containing one to about four carbon atoms and one to ten chlorine atoms. Preferable haloalkylchlorosilanes include dichloromethyl trichlorosilane, trichloromethyl trichlorosilane, dichloromethyl dichlorosilane, trichloromethyl dichlorosilane, chloromethyl trichlorosilane and hexachlorodisilane. Trichloromethyl trichlorosilane and dichloromethyl trichlorosilane are most preferred.

The reaction mixture of magnesium carboxylate and phthalate (acids, anhydride or esters) advantageous contains an aromatic silane modifier to provide a better medium for the activation of the catalyst. Suitable aromatic silanes have the structure:

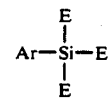

wherein Ar is an aryl group of 6 to 20 carbon atoms, such as phenyl, dodecylphenyl, cresyl, etc., each E is independently R' or OR' with R' having the notation above. The preferred aromatic silanes include diphenyl dimethoxy silane, phenyl trimethoxy silane phenyl ethyl dimethoxy silane and methyl phenyl dimethoxy silane.

Prior to use in the polymerization of alpha-olefins, the catalyst components can be further activated by comminution. Techniques of comminution by ball-milling generally are known in the art. Typically, catalyst component and hard, nonreactive balls, such as steel or carborundum balls, are placed in a closed container which is agitated usually by rolling, shaking or rocking. Such comminution is continued for a few hours up to several days, typically about 12 to about 36 hours, until the catalyst component is ground to a desired particle size typically about 5 to about 50 microns. Since mechanical action of comminution can cause a temperature increase in the comminuting mixture, care should be taken to keep the temperature below the decomposition temperature of the catalyst component. Typically, the comminuting mixture should be kept at below about 50° C.

Prepolymerization and encapsulation of the catalyst can also be carried out prior to polymerization.

The above-described catalysts are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerization conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry, bulk, and vapor phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not exceed the vapor pressure at the polymerization temperature of the alpha-olefin to be polymerized.

The polymerization time is not critical and will generally range from about TM to several hours in batch processes. Polymerization times ranging from about 1 to about 4 hours are typical in autoclave-type reactions. In slurry processes, the polymerization time can be regulated as desired. Polymerization times ranging from about TM to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use such as by distillation, percolation through molecular sieves, contacting with a compound such as an alkylaluminum compound capable of removing trace impurities, or by other suitable means. Examples of gas-phase polymerization processes in which the catalyst of this invention is useful are described in U.S. Pat. Nos. 3,957,448; 3,965,083; 3,971,768; 3,972,611; 4,129,701; 4,101,289; 3,652,527 and 4,003,712.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. The polymeric products produced in the presence of the invented catalysts can be fabricated into useful articles by extrusion, injection molding, and other common techniques.

EXAMPLE I

A one-liter glass autoclave reactor equipped with a magnet-driven agitator containing 400 ml hexane was purged with $CO_2$ and charged with 25 psig of $CO_2$ at ambient temperature. Fifty ml of a 2.18 molar n-butyl magnesium chloride solution in tetrahydrofuran was sprayed at 85° F. through a nozzle inside the reactor over a period of about five minutes while the reaction mixture was agitated at 600 RPM. A precipitate formed as soon as spraying of the solution began. After the addition, the temperature was gradually increased to 135° F. within 20 minutes. Two and one-half ml n-butyl phthalate and 7 ml $TiCl_4$ were added consecutively. The temperature was further increased to 160° F. within 10 minutes and held at 160° F. for 30 minutes. Agitation was turned off, the supernatant decanted and the solid washed three times with 250 ml portions of hexane. The solid was transferred into a dry box, filtered and weighed 15 grams.

Two hundred ml $TiCl_4$ was added to 14 grams of the solid suspended in 100 ml $TiCl_4$ in a reactor and the suspension was heated to 230° F. under agitation. A solution of 6 ml n-butyl phthalate in 24 ml n-decane was added and heating at 230° F. continued for 2 hours. The supernatant was decanted and 300 ml $TiCl_4$ was added. Heating was continued for two additional hours. The supernatant was decanted and the solid washed six times with 250 ml portions of hexane at 130°–145° F. The solid was then transferred in the dry box, filtered and dried. Final yield of the catalytic solid was 13.5 grams.

EXAMPLE II

This Example illustrates the use of magnesium carboxylate supported titanium catalyst in the slurry polymerization of propylene. A catalyst was prepared in a 7 ml bomb by adding 2 ml hexane, 20 mg of the titanium supported magnesium carboxylate prepared in Example I, using a molar ratio of triethyl aluminum to phenylmethyldimethoxy silane to titanium of 175:8:1. After the 2-liter autoclave equipped with mechanical stirrer was flushed with propylene gas, 670 ml of hexane was added, the temperature adjusted to 110° F. under agitation at 450 rpm and the catalyst was added from the bomb. Eight mmols hydrogen was added through an inlet port and sufficient propylene added to raise the pressure to 150 psig. The temperature of the autoclave was then raised to 160° F. Propylene was continuously supplied through the inlet port at a rate sufficient to maintain the pressure at 150 psig while maintaining the reactants at 160° F. for 2 hours. Two hundred forty-one grams of polymer was obtained (yield 12,050 g polypropylene per gram catalyst). The polymer had 1.7% hexane solubles and 22 lbs/ft$^3$ bulk density.

EXAMPLE III

The solid from Example I was sieved through a 45 micron sieve. About 50% of the solid comprising spherical particles remained on the sieve. The fraction, above 45 microns, was used to polymerize propylene in the manner described in Example II yielding 297 grams polymer (14,850 g polypropylene per gram catalyst).

The polymer had 0.7% hexane soluble and a bulk density of 25.2 lbs/ft³.

EXAMPLE IV

In the reactor of Example I containing 200 ml of Magala solution in hexane (analysis 1.73 wt % Mg and 0.26 wt % Al) was charged 100 ml hexane and $CO_2$ under a constant pressure of 30 psig, while the mixture was agitated at 600 RPM. Magala, a trademark of Texas Alkyls, Inc. is a di-n-butyl magnesium-triethyl aluminum complex of an approximate MW of 1151. Precipitation occurred immediately and the reaction was exothermic raising the temperature from 72° to 143° F. within a period of 15 minutes. Two hundred ml of hexane was then added, the temperature increased to 160° F. and held there for two hours. Agitation was discontinued, the solid was allowed to settle, the supernatant decanted and the solid washed once with 250 ml hexane. Agitation was turned on and a solution of 1 ml di-iso-butyl phthalate in 20 ml hexane was added dropwise, followed by 5 ml $TiCl_4$. Agitation was continued for one more hour after which time the mixture was contacted with propylene under a constant pressure of 30 psig for one hour. The solid was washed 5 times with 250 ml portions of hexane, filtered and weighed 12 grams. To 11 grams of the solid in 200 ml $TiCl_4$ in the reactor was added 200 ml $TiCl_4$ and the suspension was heated to 230° F. under agitation, 4 ml di-n-butyl phthalate in 20 ml decane was added and heating at 230° C. continued for one hour. Agitation was turned off, the solid settled, and the supernatant siphoned out. Titanium tetrachloride 300 ml was added and heating at 230° F. resumed for 2 hours. After decantation, the product was washed at 160° F. seven times with 250 ml portions of hexane, filtered and weighed 10 grams. A slurry polymerization (as in Example II) showed a yield of 1,500 grams PP/g catalyst, hexane solubles 2.3%, bulk density 21 lb/ft³.

EXAMPLE V

A one-liter glass autoclave reactor equipped with a magnet-driven agitator containing 400 ml hexane was charged with 20 psig of $CO_2$ while cooling to 40°–45° F. Ten ml of a 2.27 molar n-butyl magnesium chloride solution in tetrahydrofuran was added dropwise to the reactor over a period of about 30 minutes while the reaction mixture was agitated at 600 RPM. A precipitate (milky solution) formed rapidly after addition. After the addition, the temperature was gradually increased to 160° F. within 60 minutes. Agitation was turned off, the supernatant decanted and the solid washed three times with 250 ml portions of hexane. The solid spherical particles were transferred into a dry box and filtered.

EXAMPLE VI

A one-liter glass autoclave reactor equipped with a magnet-driven agitator containing 100 ml of chlorobenzene and 300 ml hexane under nitrogen was charged with 20 psig of $CO_2$ at 60° F. Twenty ml of a 2.18 molar n-butyl magnesium chloride solution in tetrahydrofuran was added dropwise over a period of about 20 minutes while the reaction mixture was agitated at 450 RPM. A precipitate of uniform particles formed as soon as the addition began. After the addition was complete, the resulting suspension was transferred under nitrogen to a bottle and filtered in a dry box. A total of 12.6 grams of solid was recovered. The solid was resuspended in 300 ml of titanium tetrachloride and heated to 230° F. within 45 minutes under agitation. Five ml di-n-butyl phthalate in 20 ml of decane were added dropwise and the temperature maintained at 230° F. for two hours. After the agitation was stopped and the solids allowed to settle, supernatant liquid was decanted. After 300 ml of $TiCl_4$ were added, agitation was continued for one hour at 230° F. Agitation was turned off, the supernatant decanted and the solid washed three times at 230° F. with decane and three times with hexane at 135° F. The solid was transferred into a dry box, filtered and weighed 13 grams. The resulting catalyst particles were raspberry-like agglomerates with a size of about 80–100 microns. Each agglomerate consisted of smaller particles of about 20 microns diameter.

EXAMPLE VII

A catalyst was prepared using 20 mg of the solid prepared in Example VI, 1.4 ml of 25 wt % triethylaluminum in hexane and 1.0 ml of 0.1 M diphenyldimethoxysilane in hexane. The molar ratio of triethylaluminum to silane to titanium was about 175:8:1. After a 2-liter autoclave equipped with mechanical stirrer was flushed with propylene gas, 650 ml of hexane was added, the temperature adjusted to 110° F. under agitation at 450 rpm and the above-described catalyst was added. Hydrogen was added (4 psig) through an inlet port and sufficient propylene added to raise the pressure to 150 psig and the temperature raised to 160° F. Propylene was continuously supplied through the inlet port at a rate sufficient to maintain the pressure at 150 psig while maintaining the reactants at 160° F. for 2 hours. Polymer product was recovered; a yield of 12,550 grams of polymer per gram of catalyst was obtained. The polymer had 0.4% hexane solubles and 25.5 lbs/ft³ bulk density.

EXAMPLE VIII

In a Hoke sample cylinder inside a drybox, were mixed 30 ml of a 2.3 N tetrahydrofuran solution of n-butylmagnesium chloride with 30 ml of tetrahydrofuran. A one-liter glass autoclave reactor equipped with a magnet-driven agitator containing 100 ml of tetrahydrofuran and 10 ml of dioxane under nitrogen was charged with 18 psig of $CO_2$ at room temperature. Thirty ml of a 2.27 molar n-butyl magnesium chloride solution in tetrahydrofuran was added dropwise over a period of about 15 minutes while the reaction mixture was agitated at 500 RPM. A precipitate of uniform particles formed as soon as the addition began. After the addition was complete, the temperature was increased to 150° F. and maintained at that temperature for 30 minutes. The resulting solids were washed three times with 200-ml portions of hexane and transferred under nitrogen to a bottle and filtered in a dry box. The resulting product particles were uniform and had an average particle size of 23 microns.

We claim:

1. A process of preparing a composition comprising a transition metal component and a magnesium carboxylate support which comprises the steps of reacting a solution of a hydrocarbyl magnesium compound with sufficient carbon dioxide to form a magnesium carboxylate precipitate and reacting said magnesium carboxylate with a transition metal component wherein said solution comprises at least one ether.

2. The process of claim 1 wherein said transition metal component comprises a titanium (IV) halide.

3. The process of claim 1 wherein the hydrocarbyl magnesium compound comprises a dialkyl magnesium compound.

4. The process of claim 1 wherein the hydrocarbyl magnesium compond comprises an alkl magnesium halide.

5. The process of claim 1 wherein said ether comprising tetrahydrofuran.

6. The process of claim 5 wherein the transition metal component comprises a titanium (IV) halide.

7. A process of preparing a composition comprising titanium metal component and a magnesium carboxylate support which comprises the steps of reacting a solution of hydrocarbyl magnesium halide with carbon dioxide to precipitate magnesium carboxylate and reacting said magnesium carboxylate with a transition metal component comprising a titanium (IV) halide wherein said solution comprises at least one ether.

8. The process of claim 7 wherein the hydrocarbyl magnesium halide compound comprises an alkyl magnesium halide compound.

9. The process of claim 7 wherein the ether comprises tetrahydrofuran.

10. The process of claim 8 wherein the hydrocarbyl magnesium halide compound comprises butyl magnesium chloride.

11. The process of claim 8 wherein the hydrocarbyl magnesium halide compound comprises butyl magnesium chloride complexed with tetrahydrofuran.

12. The process of claim 1 wherein the hydrocarbyl magnesium compound is dissolved in a mixture comprising hexane, chlorobenzene and tetrahydrofuran.

13. The process of claim 7 wherein the hydrocarbyl magnesium compound is dissolved in a mixture comprising tetrahydrofuran and 1,4-dioxane.

14. The process of claim 7 wherein the titanium (IV) halide is titanium tetrachloride.

15. The process of preparing a composition comprising a transition metal component, tetrahydrofuran and a magnesium carboxylate support which comprises the steps of adding a solution of hydrocarbyl magnesium halide in tetrahydrofuran to a reactor comprising gaseous carbon dioxide and liquid comprising at least one member selected from the group consisting of liquid hydrocarbon liquid, halohydrocarbon and ether to form tetrahydrofuran/magnesium carboxylate particles and reacting said particles with a transition metal component.

16. The process of claim 15 wherein the hydrocarbyl magnesium halide is dissolved in a mixture of tetrahydrofuran and dioxane.

17. The process of claim 15, wherein the transition metal component comprises a titanium (IV) halide.

18. The process of claim 17 wherein the hydrocarbyl magnesium halide compound comprising butyl magnesium chloride.

* * * * *